(12) United States Patent
Jun et al.

(10) Patent No.: US 8,722,210 B2
(45) Date of Patent: May 13, 2014

(54) LOW EMISSIVITY GLASS AND METHOD FOR MANUFACTURING THE SAME

(75) Inventors: Youn-Ki Jun, Anyang-si (KR); Keum-Shil Cho, Daejeon (KR); Il Joon Bae, Daejeon (KR); Sung Seock Hwang, Cheongju-si (KR)

(73) Assignee: LG Hausys, Ltd., Seoul (KR)

( * ) Notice: Subject to any disclaimer, the term of this patent is extended or adjusted under 35 U.S.C. 154(b) by 113 days.

(21) Appl. No.: 13/321,692

(22) PCT Filed: Jul. 12, 2010

(86) PCT No.: PCT/KR2010/004520
§ 371 (c)(1),
(2), (4) Date: Nov. 21, 2011

(87) PCT Pub. No.: WO2011/010824
PCT Pub. Date: Jan. 27, 2011

(65) Prior Publication Data
US 2012/0064335 A1    Mar. 15, 2012

(30) Foreign Application Priority Data
Jul. 23, 2009    (KR) .................. 10-2009-0067301

(51) Int. Cl.
*B32B 15/04*    (2006.01)

(52) U.S. Cl.
USPC ........... 428/701; 428/688; 428/689; 428/699; 428/702

(58) Field of Classification Search
CPC .......... B32B 9/00; B32B 15/00; B32B 15/04; B32B 17/00; B32B 17/06; B32B 17/061; B32B 2255/00; B32B 2255/06; B32B 2255/20; B32B 2255/28; B32B 2551/00; C03C 15/00; C03C 17/00; C03C 17/06; C03C 17/22; C03C 17/34; C03C 17/23; C03C 17/3411; C03C 17/36; C03C 17/3605; C03C 17/3613; C03C 17/3642; C03C 17/3644; C03C 17/366; C23C 14/00; C23C 14/06; C23C 14/08; C23C 14/086; C23C 14/081; C23C 14/22; C23C 14/34; C23C 14/548
USPC .......... 428/428, 432, 688, 689, 701, 702, 699
See application file for complete search history.

(56) References Cited

U.S. PATENT DOCUMENTS 5,344,718 A * 9/1994 Hartig et al. .................. 428/623
5,377,045 A * 12/1994 Wolfe et al. .................. 359/585
(Continued)

FOREIGN PATENT DOCUMENTS

EP        1329307 A1    7/2003
WO    2007/047211 A1    4/2007

*Primary Examiner* — David Sample
*Assistant Examiner* — Lauren Colgan
(74) *Attorney, Agent, or Firm* — Nath, Goldberg & Meyer; Jerald L. Meyer

(57) ABSTRACT

The present invention relates to low emissivity glass and to a method for manufacturing the same. The low emissivity glass comprises: a low emissivity layer; and a dielectric layer formed on the low emissivity layer, wherein the glass has an emissivity of 0.01 to 0.3 and a visible transmittance of 70% or more. According to the present invention, low emissivity glass having good emissive performance while also exhibiting high visible transmittance can be provided. Further, according to the present invention, the manufacturing process for the above-described low emissivity glass can be simplified, and initial investment amount can be reduced.

10 Claims, 3 Drawing Sheets

(56) References Cited

U.S. PATENT DOCUMENTS

| | | | |
|---|---|---|---|
| 6,132,881 A * | 10/2000 | Hartig et al. | 428/432 |
| 2003/0186064 A1* | 10/2003 | Murata et al. | 428/432 |
| 2005/0042459 A1* | 2/2005 | Kriltz et al. | 428/432 |
| 2007/0036986 A1* | 2/2007 | Chonlamaitri et al. | 428/428 |
| 2007/0081228 A1* | 4/2007 | Hartig | 359/359 |
| 2007/0281171 A1 | 12/2007 | Coster et al. | |
| 2009/0047466 A1 | 2/2009 | German et al. | |
| 2009/0195865 A1 | 8/2009 | Kleideiter et al. | |

\* cited by examiner

LOW EMISSIVITY GLASS AND METHOD FOR MANUFACTURING THE SAME

This is a National Phase Application filed under 35 U.S.C. 371 as a national stage of PCT/KR2010/004520, filed Jul. 12, 2010, and claiming the benefit from Korean Application No. 10-2009-0067301, filed Jul. 23, 2009, the content of which is hereby incorporated by reference in its entirety.

TECHNICAL FIELD

The present invention relates to low emissivity glass and a method for manufacturing the same.

BACKGROUND ART

Low emissivity glass (low-e glass) is glass having low emissivity, which is functional glass formed by coating the surface of glass with a particular layer to reflect solar radiation in summer and to store infrared light emitted from an indoor heater in winter, thereby realizing energy saving effects.

Conventionally, low emissivity glass is prepared by introducing oxygen into a chamber to create an oxygen atmosphere and depositing a thin oxide layer on a low emissivity layer using a metal target material in the oxygen atmosphere.

Thus, low emissivity glass prepared by such a conventional method includes a first dielectric layer formed of a metal oxide on a glass substrate, a low emissivity layer formed of silver (Ag) or the like, and a second dielectric layer formed of a metal oxide, which are sequentially deposited.

However, since conventional low emissivity glass uses metal as a target material in an oxygen atmosphere upon deposition of the second dielectric layer on the low emissivity layer, as described above, a conductive metal contained in the low emissivity layer is also oxidized due to high oxygen partial pressure in the chamber, causing the low emissivity layer and the second dielectric layer to be mixed and form an unclear interfacial boundary therebetween. As a result, the low emissivity glass has remarkably increased emissivity and does not properly function.

In order to solve such problems, a primer layer of metallic nickel chrome is deposited on the low emissivity layer prior, and the dielectric layer is then deposited on the primer layer in an oxygen atmosphere, thereby preventing oxidation of a conductive metal contained in the low emissivity layer.

In this method, although oxidation of the conductive metal in the low emissivity layer is prevented to maintain low emissivity, the primer layer is additionally deposited on the low emissivity layer, thereby increasing the thickness of the thin metal layer and causing decrease in visible transmittance, complicating the overall process, and increasing manufacturing cost.

DISCLOSURE

Technical Problem

The present invention is directed to solving problems mentioned above and provides effective low emissivity glass and a method for manufacturing the same, in which a dielectric layer is formed directly on a low emissivity layer without formation of a primer layer to exhibit not only excellent emissivity but also high visible transmittance.

Technical Solution

In accordance with one aspect of the present invention, low emissivity glass includes a low emissivity layer and a dielectric layer formed on the low emissivity layer, and has an emissivity of 0.01 to 0.3 and a visible transmittance of 70% or more.

In accordance with another aspect of the present invention, a method for manufacturing low emissivity glass includes depositing a dielectric layer directly on a low emissivity layer using a metal oxide as a target under a vacuum atmosphere.

Advantageous Effects

In low emissivity glass according to embodiments of the invention, a dielectric layer is formed without formation of a primer layer while preventing oxidation of a functional material contained in a low emissivity layer. Accordingly, the low emissivity glass maintains excellent visible transmittance and emissive performance, thereby increasing insulation effects while securing a clear view.

Further, the method for manufacturing low emissivity glass according to embodiments of the invention reduces investment and material costs, thereby realizing excellent process efficiency.

MODE FOR INVENTION

Figure 1:
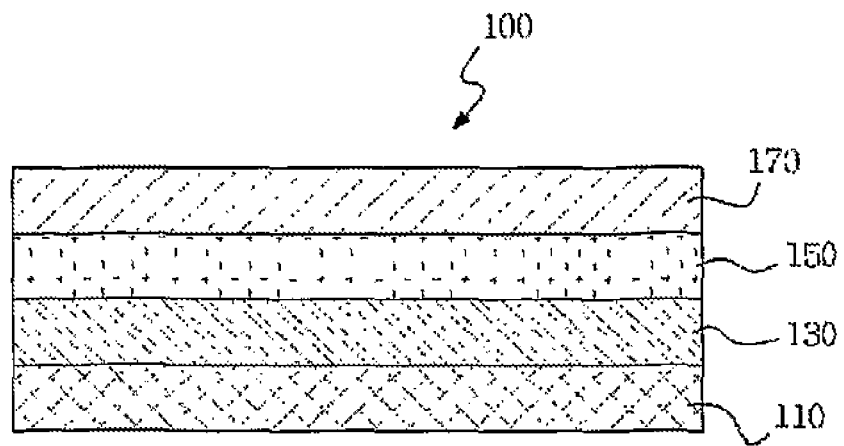
FIG. 1 is a schematic sectional view of a layer structure of low emissivity glass according to one embodiment of the present invention.

The present invention relates to low emissivity glass including a low emissivity layer and a dielectric layer formed on the low emissivity layer, and having an emissivity of 0.01 to 0.3 and a visible transmittance of 70% or more.

Hereinafter, the low emissivity glass according to the present invention will be described in detail.

As described above, the low emissivity glass according to the present invention includes the low emissivity layer and the dielectric layer formed on the low emissivity layer, and has an emissivity of 0.01 to 0.3 and a visible transmittance of 70% or more.

Herein, the term "low emissivity glass" refers to energy saving plate glass, also referred to as low-e glass, in which a thin coating of metal or a metal oxide having excellent electrical conductivity is formed on general plate glass to decrease emissivity of the coating while maintaining transmitting properties in a visible light range, thereby providing excellent insulation effects.

Further, the term "emissivity" means a ratio at which an object absorbs, transmits, and reflects energy having particular wavelengths. That is, in the present invention, emissivity indicates a degree of absorbing infrared energy in an infrared wavelength range. Specifically, when far-infrared radiation having strong thermal effects and corresponding to a wavelength range of about 2,500 to 40,000 nm is applied, emissivity means a ratio of absorbed infrared energy to applied infrared energy.

According to Kirchhoffs law, the amount of infrared energy absorbed by a material is the same as the amount of reemitted energy, and thus absorption ratio is the same as emissivity.

Further, since unabsorbed infrared energy is reflected from the surface of a material, emissivity decreases with increasing degree of reflection of infrared energy. This relationship may be numerically expressed by emissivity=1−infrared reflectivity.

Emissivity may be measured by various methods known in the art, without being limited to, for example, using MK-3 equipment according to KSL 2514.

For low emissivity glass, an absorption ratio to far infrared rays having strong thermal effects, i.e. emissivity, is very important in measuring insulation performance.

According to the present invention, the low emissivity glass may have an emissivity of 0.01 to 0.3, preferably 0.01 to 0.2, more preferably 0.01 to 0.1, and still more preferably 0.01 to 0.08.

If the emissivity is less than 0.01, insulation effects are improved due to reflection of far infrared rays but visible transmittance can decrease. If the emissivity is greater than 0.3, the reflectivity of far infrared rays is too low, thereby deteriorating insulation performance.

Further, according to the present invention, the low emissivity glass may have a visible transmittance of 70% or more, preferably 80% or more, and more preferably 85% or more.

If the visible transmittance is less than 70%, it is difficult to provide a clear view.

As described above, the low emissivity glass according to the present invention has low emissivity and high visible transmittance and thus may be used as functional glass providing excellent insulation effects and securing a clear view.

Furthermore, the sheet resistance of the low emissivity glass according to the present invention is not particularly limited as long as the low emissivity glass can have excellent emissivity as well as excellent visible transmittance. For example, the low emissivity glass may have a sheet resistance of 5 to 15 $\Omega/cm^2$.

Herein, the term "sheet resistance" refers to a specific resistance per unit thickness of a thin layer. With lower sheet resistance, emissivity decreases, thereby providing excellent insulation performance. Accordingly, the sheet resistance may be used as a criterion to measure the infrared reflectivity of the low emissivity glass.

The sheet resistance may be measured by various methods, without being limited to, for example, using a multimeter or a four-point probe.

If the sheet resistance of the low emissivity glass is less than 5 $\Omega/cm^2$, the low emissivity layer needs to be thick, so that visible transmittance can be reduced. If the sheet resistance of the low emissivity glass exceeds 15 $\Omega/cm^2$, an emissivity value becomes too high, thereby reducing insulation effects.

The low emissivity layer is a functional layer that includes metal having excellent heat conductivity to shield radiant rays within the infrared range. The low emissivity layer may include, without being limited to, at least one selected from the group consisting of (Ag), copper (Cu), gold (Au), aluminum (Al), and platinum (Pt), preferably Ag having excellent electric conductivity in terms of price, color, and low emissive properties.

The low emissivity glass according to the present invention may include the above illustrated conductive metals alone, may include a conductive metal doped with at least one element selected from the group consisting of nickel (Ni), palladium (Pd), Pt, Cu, and Au in view of improvement in durability, and may further include other additives to improve various functionalities.

In addition, the thickness of the low emissivity layer is not particularly limited but may be variously modified as long as low emissivity as well as excellent visible transmittance is realized at the same time. For example, the low emissivity layer may have a thickness of 8 to 35 nm, preferably 8 to 15 nm.

If the thickness of the low emissivity layer is less than 8 nm, emissivity becomes considerably high, thereby making it difficult to achieve insulation effects. If the thickness of the low emissivity layer is greater than 35 nm, emissivity decreases but visible transmittance is remarkably reduced, thereby making it difficult to secure a clear view.

In the low emissivity glass according to the present invention, the dielectric layer may be formed directly on the low emissivity layer.

Here, it will be understood that when the dielectric layer is referred to as being "formed directly on" the low emissivity layer, there is no intervening layer (e.g., primer layer) between the low emissivity layer and the dielectric layer and the dielectric layer is deposited directly on the low emissivity layer.

That is, in the low emissivity glass according to this invention, a layer may be formed on the low emissivity layer, or as described above, the dielectric layer is formed directly on the low emissivity layer. When the dielectric layer is formed directly on the low emissivity layer, decrease in visible transmittance or increase in emissivity, which may occur due to an intervening layer, may be prevented, a process is simplified, and investment costs may be reduced.

The dielectric layer may include, without being limited to, at least one selected from the group consisting of zinc oxide, aluminum oxide, zirconium oxide, silicon dioxide, tin oxide, titanium oxide, bismuth (Bi) oxide, indium-doped tin oxide, gallium (Ga)-doped zinc oxide, and aluminum-doped zinc oxide.

However, the dielectric layer is not limited to the above materials, but may include various metal oxides and may include metal oxides doped with at least one element selected from the group consisting of Bi, B, Al, Si, Mg, Sb, and Be in order to improve durability.

The dielectric layer may contribute to improvement in chemical resistance, moisture resistance, and abrasion resistance of the low emissivity glass and to decrease in emissivity of the low emissivity glass.

The dielectric layer may have a thickness of 10 to 100 nm, preferably 30 to 40 nm, without being limited thereto.

Here, if the thickness of the dielectric layer is less than 10 nm, a glass surface may be discolored. If the thickness of the dielectric layer is greater than 100 nm, visible transmittance may be reduced.

Moreover, the low emissivity glass according to this invention may further include a dielectric layer formed on a lower surface of the low emissivity layer.

That is, the dielectric layer is further formed between a glass substrate and the low emissivity layer. The dielectric layer functions to prevent contamination not only on the surface of the glass substrate but also on the low emissivity layer due to $Na^+$ ions or the like and improves adhesion between the substrate and the low emissivity layer and emissivity.

Further, the low emissivity glass according to this invention may further include an overcoating layer formed on the dielectric layer formed on the low emissivity layer.

The overcoating layer protects the surface of the low emissivity glass and imparts durability. The overcoating layer may include any material generally used in the art for an overcoating layer, without being particularly limited. For example, the overcoating layer may include silicon nitride (SiN), aluminum doped silicon nitride (SiAlN), or silicon nitride oxide (SiNO$_x$).

The low emissivity glass according to this invention may further include an undercoating layer formed on the lower surface of the low emissivity layer.

The undercoating layer protects the substrate of the low emissivity glass and imparts durability. The overcoating layer may include any material generally used in the art for an undercoating layer, without being particularly limited. For example, the overcoating layer may include silicon nitride (SiN), aluminum doped silicon nitride (SiAlN), or silicon nitride oxide (SiNO$_x$).

As described above, the low emissivity glass according to the present invention has excellent insulation performance and high visible transmittance due to low emissivity and thus may be widely used as glass for buildings or automobiles, which requires insulation effects and a clear view.

However, the low emissivity glass according to this invention is not limited to the above uses and may be employed as glass for various fields requiring high insulation performance and a clear view. Further, since the low emissivity glass does not involve deposition of an additional layer to secure emissivity and to improve visible transmittance, process costs are reduced, and thus the glass may be useful to manufacture large sheets of glass.

Next, low emissivity glass according to one embodiment of the present invention will be described with reference to FIG. 1. This embodiment is provided for illustrative purposes only and is not to be in any way construed as limiting the present invention.

FIG. 1 is a schematic sectional view of a layer structure of the low emissivity glass according one embodiment of the present invention.

Referring to FIG. 1, the low emissivity glass according to the embodiment includes a substrate 110, a dielectric layer 130, a low emissivity layer 150, and a dielectric layer 170.

The dielectric layer 130, the low emissivity layer 150, and the dielectric layer 170 are sequentially formed on the substrate 110, and an additional layer (e.g., primer layer) having low electric conductivity is not formed between the dielectric layer 130 and the low emissivity layer 150 or between the low emissivity layer 150 and the dielectric layer 170, thereby not reducing visible transmittance.

In addition, the present invention provides a method for manufacturing low emissivity glass, which includes depositing a dielectric layer directly on a low emissivity layer using a metal oxide as a target in a vacuum.

Here, deposition may be conducted, for example, at a process pressure of 1 to 10 mTorr, preferably 2 to 6 mTorr, and more preferably 3 to 5 mTorr in a vacuum.

If the process pressure is less than 1 mTorr, a deposition material having high energy applies impact to layers, thereby deteriorating quality of layers. If the process pressure is greater than 10 mTorr, a mean free path of particles is reduced, thereby making deposition difficult.

Further, various inert gases generally used in the art may be provided in order to create a vacuum for deposition. The inert gases may include, without being limited to, nitrogen and argon, preferably argon.

To conduct deposition in an inert gas atmosphere, the injection amount of inert gas may be, without being limited to, 10 to 100 Standard Cubic Centimeters per Minute (sccm).

If the amount of inert gas is less than 10 sccm, the inert gas has a low partial pressure and plasma ignition of sputtering does not occur, reducing deposition efficiency. If the amount of the inert gas is greater than 100 sccm, the inert has a too high partial pressure and a mean free path of particles is reduced, so that deposition is not carried out or properties of layers may be deteriorated due to gas molecules.

Further, the deposition method may include, without being particularly limited to, any deposition method in a vacuum used in the art in order to deposit a functional layer on glass.

For example, any vacuum deposition method conducted in a vacuum may be used, and any of resistance-heated evaporation, electron beam evaporation, laser beam evaporation and plasma sputtering may be used for deposition. Preferably, plasma sputtering may be used.

Plasma sputtering may provide a uniform layer, high adhesion force of a thin layer, and allow use of various materials, such as metal, alloys, compounds and insulating materials, when forming a layer. Further, plasma sputtering enables cooing of a target and use of a large target to be suited for manufacturing large scale thin-layer glass. Examples of plasma sputtering may include DC sputtering, RF sputtering, magnetron sputtering, reactive sputtering, and the like.

When plasma sputtering is used, the dielectric layer may be deposited by applying an input power of 1 to 5 W/cm$^2$.

If the input power is less than 1 W/cm$^2$, deposition rate is low, decreasing productivity, and adhesive strength between a deposited layer and the substrate is reduced. If the input power is greater than 5 W/cm$^2$, the substrate may be damaged or a raw material provided as a target is destroyed or melted, thereby causing serious damage to process equipment.

For example, in a method for manufacturing low emissivity glass through plasma sputtering, an inert gas such as argon is supplied into a vacuum chamber and voltage is applied to a cathode on which a target material is installed. In this case, electrons emitted from the cathode collide with argon atoms to change argon into ions (Ar$^+$). Then, the argon is excited to emit electrons while emitting energy, so that glow discharge occurs to form plasma in which ions and electrons exist together.

Ar$^+$ ions in the plasma rapidly move to the cathode (target), i.e. a metal oxide, due to a high potential difference, and collide with the surface of the target, so that target atoms are emitted to form a thin layer on the low emissivity layer, thereby depositing the dielectric layer.

In the method for manufacturing low emissivity glass according to this embodiment, when the dielectric layer is deposited on the low emissivity layer, deposition may be conducted in a vacuum instead of in a high pressure oxygen atmosphere. Thus, it is possible to prevent oxidation of metal materials in the low emissivity layer even without depositing a primer layer for preventing oxidation of the low emissivity layer.

As such, since the low emissivity layer is not oxidized, the method according to this embodiment may maintain excellent emissive performance without forming a primer layer for preventing oxidation of the low emissivity layer, thereby preventing decrease in visible transmittance which can occur due to deposition of the primer layer having low electrical conductivity.

EXAMPLES

Hereinafter, the present invention will be explained in more detail with reference to the following examples and comparative examples. These examples are provided for illustrative purposes only and are not to be in any way construed as limiting the present invention.

Example 1

A 370 mm×470 nm×6 mm float glass substrate was prepared. Before formation of a layer, a vacuum state was created by removing air until a process pressure of a vacuum chamber reached 5 mTorr, and then the glass substrate was installed in the chamber. Here, zinc oxide was disposed as a target material on a cathode of the chamber in advance.

Subsequently, argon was introduced at an injection rate of 30 sccm into the chamber and plasma was generated by applying an input power of 1.4 W/cm$^2$. Accordingly, target atoms were deposited on the glass substrate, thereby forming a first dielectric layer consisting of zinc oxide.

Likewise, silver (Ag) was disposed as a target material on the cathode in advance, followed by introduction of argon at an injection rate of 20 sccm and application of an input power of 0.8 W/cm$^2$, thereby forming a low emissivity layer on the first dielectric layer. Further, zinc oxide was disposed as a target material on the cathode, followed by introduction of argon at an injection rate of 30 sccm and application of an input power of 1.4 W/cm$^2$, thereby forming a second dielectric layer on the low emissivity layer.

In the prepared low emissivity glass, the first dielectric layer on the glass substrate has a thickness of 35 nm, the low emissivity layer has a thickness of 10 nm, and the second dielectric layer on the low emissivity layer has a thickness of 45 nm.

Example 2

Low emissivity glass was prepared in the same manner as in Example 1 except that deposition was conducted such that the low emissivity layer had a thickness of 11.5 nm and the second dielectric layer had a thickness of 59 nm.

Example 3

Low emissivity glass was prepared in the same manner as in Example 1 except that deposition was conducted such that the low emissivity layer had a thickness of 11.5 nm.

Comparative Example 1

Low emissivity glass was prepared in the same manner as in Example 1 except that a first primer layer was deposited on a first dielectric layer formed on a glass substrate using nickel chrome as a target material by introducing argon at 30 sccm and applying an input power of 0.8 W/cm$^2$; a low emissivity layer was deposited on the first primer layer; a second primer layer was deposited on the low emissivity layer using nickel chrome as a target material by introducing argon at 30 sccm and applying an input power of 0.8 W/cm$^2$; and a second dielectric layer was deposited on the second primer layer using zinc oxide as a target material.

Here, the first primer layer and the second primer layer each had a thickness of 1.5 nm.

Comparative Example 2

Low emissivity glass was prepared in the same manner as in Example 1 except that a first dielectric layer and a second dielectric layer were deposited using zinc as a target material in a high density oxygen atmosphere in which oxygen and argon each were mixed at 20 sccm; and a first primer layer was deposited on the first dielectric layer using nickel chrome as a target material in the same manner as in Comparative Example 1, followed by deposition of a low emissivity layer on the first primer.

Here, the first primer layer had a thickness of 1.5 nm.

Comparative Example 3

Low emissivity glass was prepared in the same manner as in Comparative Example 2 except that a first primer layer was not formed and a low emissivity layer was deposited directly on a first dielectric layer.

Test Examples

1. Emissivity and Visible Transmittance

Emissivity and Visible transmittance of each of the low emissivity glasses according to Example 1 and Comparative Examples 1 to 3 were measured using an emissivity measuring device (INGLAS TIR 100-2) and a spectrophotometer (Model Shimazu solid spec 3700), and results are illustrated in Table 1.

TABLE 1

| | | Layer structure | Emissivity ($\epsilon$) | Visible transmittance (VT) |
|---|---|---|---|---|
| Low oxygen partial pressure | Example 1 | ZAZ | 0.078 | 86.7 |
| | Comparative Example 1 | ZNANZ | 0.086 | 56.2 |
| High oxygen partial pressure | Comparative Example 2 | Z*ANZ* | 0.062 | 68 |
| | Comparative Example 3 | Z*AZ* | 0.882 | 63 |

Z: Dielectric layer deposited using zinc oxide
Z*: Dielectric layer deposited using zinc
$\epsilon$: Emissivity
N: Nickel chrome layer
VT: Visible transmittance (%)
A: Silver layer (Ag)

As shown in Table 1, the low emissivity glass according to Example 1, obtained by vacuum-depositing the first dielectric layer and the second dielectric layer using zinc oxide in an argon atmosphere, exhibited excellent visible transmittance as compared with the low emissivity glass according to Comparative Example 1, prepared in the same manner as in Example 1 except that the nickel chrome layers were formed on upper and lower surfaces of the silver layer as primer layers.

Namely, the low emissivity glass according to Example 1 had a low emissivity of 0.078, and exhibited a remarkably high visible transmittance of 86.7% as compared with the low emissivity glasses according to Comparative Examples 1 and 2.

Further, as to optical properties of the low emissivity glass according to Comparative Example 2, prepared by vacuum-depositing the second dielectric layer using zinc as a target material in a high density oxygen atmosphere, the low emissivity glass according to Comparative Example 2 prevented oxidation of the low emissivity layer due to deposition of the primer layer and exhibited a low emissivity of 0.062, but had a low visible transmittance of 68% due to deposition of the primer layer. The low emissivity glass according to Comparative Example 3, prepared by depositing the first dielectric layer and the second dielectric layer using zinc as a target material in a high density oxygen atmosphere without a primer layer, had remarkably high emissivity and low visible transmittance.

2. Sheet Resistance and Optical Properties

Next, sheet resistance, emissivity and visible transmittance of each of the low emissivity glasses according to Examples 1 to 3 and Comparative Example 1 were measured, and results are illustrated in Table 2.

TABLE 2

|  | Layer structure | Sheet resistance ($\Omega/cm^2$) | | Emissivity ($\epsilon$) | Optical properties Visible transmittance (VT) |
|---|---|---|---|---|---|
|  |  | Average | Standard deviation |  |  |
| Example 1 | ZAZa | 7.44 | 0.90 | 0.078 | 86.7 |
| Example 2 | ZAZb | 7.12 | 0.50 | 0.065 | 85.6 |
| Example 3 | ZAZc | 8.96 | 0.73 | 0.063 | 88.3 |
| Comparative Example 1 | ZNANZ | 8.92 | 0.46 | 0.086 | 56.2 |

Z: Dielectric layer deposited using zinc oxide
N: Nickel chrome layer
A: Silver (Ag) layer As shown in Table 2, the low emissivity glass according to Example 2 had the lowest average sheet resistance, the low emissivity glass according to Example 3 had the lowest emissivity, and the low emissivity glasses according to Examples 1 to 3 and Comparative Example 1 had appropriate sheet resistance and emissivity.

However, the low emissivity glasses according to Examples 1 to 3 had remarkably high visible transmittance as compared with the low emissivity glass according to Comparative Example 1.

As compared with the low emissivity glasses according to Examples 1 to 3, the low emissivity glass according to Comparative Example 1 further included the nickel chrome layer having relatively lower sheet resistance than zinc oxide in the same structure. As a result, the low emissivity glass according to Comparative Example 1 had lower average sheet resistance than the low emissivity glass according to Example 3. However, in the primer layer formed of metal, such as nickel chrome, even a slight increase in thickness by deposition significantly affected visible transmittance, and thus the low emissivity glass according to Comparative Example 1 had considerably decreased visible transmittance.

On the contrary, the low emissivity glasses according to Examples 1 to 3 maintained excellent emissive performance while exhibiting an excellent visible transmittance of 80% or more, without formation of a nickel chrome layer.

3. Measurement of Atomic Components of Second Dielectric Layer

Element analysis was conducted using x-ray photoelectron spectroscopy (XPS) while performing sputter etching using argon particles on the surface of the low emissivity glasses according to Examples 1 and Comparative Example 3.

Figure 2:
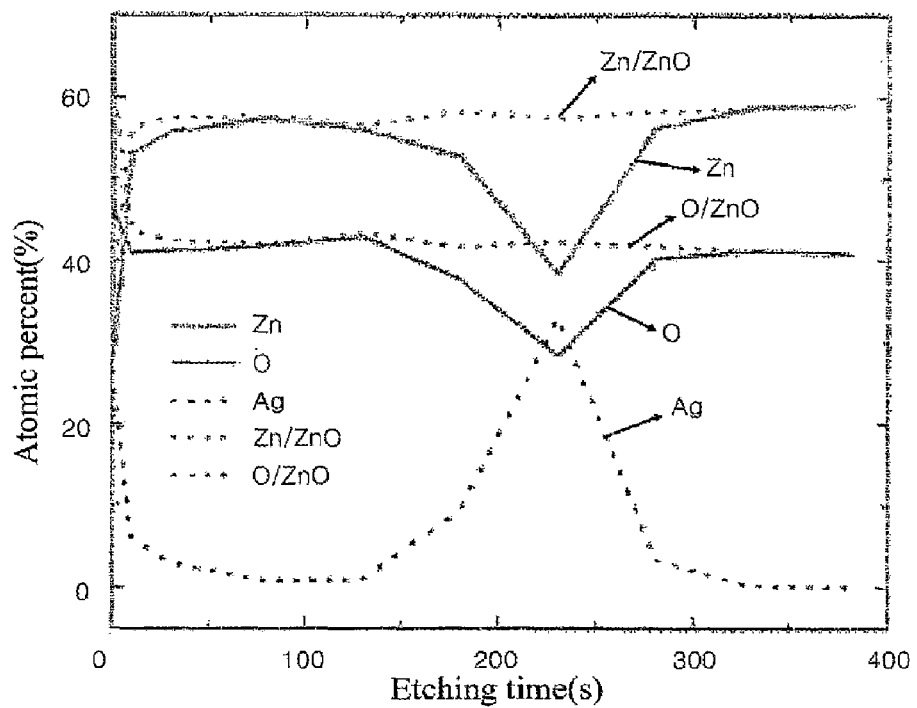
FIG. 2 is a graph illustrating distribution of atoms between layers of low emissivity glass prepared by depositing a dielectric layer on a low emissivity layer using a metal as a target in an oxygen atmosphere according to a conventional method of manufacturing low emissivity glass.

As a result, referring to FIG. 2, the low emissivity glass according to Comparative Example 3, prepared by depositing the dielectric layer on the low emissivity layer using metal as a target in a high density oxygen atmosphere according to a conventional method of manufacturing low emissivity glass, involved mixing of the low emissivity layer and the dielectric layer, so that silver was observed on the surface of the second dielectric layer and a mixing phenomenon wherein silver was eluted on the surface occurred.

Here, a portion undergoing etching for a short time is a surface of a thin multi-layer. As shown in FIG. 2, in the low emissivity glass according to Comparative Example 3, a certain amount of silver forming the low emissivity layer appeared on the surface, and a trace amount of silver was found at a boundary between the second dielectric layer and the low emissivity layer.

Figure 3:
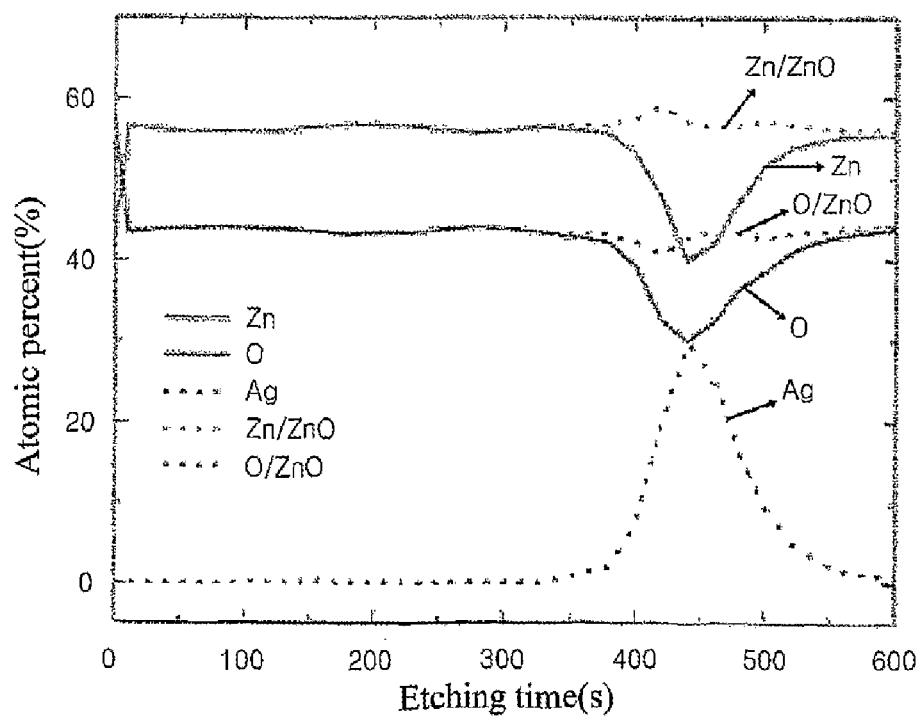
FIG. 3 is a graph illustrating distribution of atoms between layers of low emissivity glass prepared by depositing a dielectric layer on a low emissivity layer using a metal oxide as a target in an argon atmosphere in a vacuum according to a method of manufacturing low emissivity glass according to one embodiment of the present invention.

On the contrary, referring to FIG. 3, in the low emissivity glass according to Example 1, no silver was observed on the surface for a predetermined time while etching was performed, and silver started to uniformly appear in the low emissivity layer. Accordingly, the low emissivity layer and the dielectric layer were clearly divided.

The invention claimed is:

1. Low emissivity glass comprising:
a substrate;
a low emissivity layer formed on the substrate; and
an oxide dielectric layer having a thickness of 10 to 100 nm formed on the low emissivity layer in an oxygen-deprived environment,
wherein the low emissivity glass has an emissivity of 0.01 to 0.3 and a visible transmittance of 70% or more, and
wherein the oxide dielectric layer is formed on the low emissivity layer and without oxidation of the low emissivity layer, resulting in the oxide dielectric layer and low emissivity layer having a distinct interfacial boundary with each other.

2. The low emissivity glass of claim 1, wherein the low emissivity glass has an emissivity of 0.01 to 0.2.

3. The low emissivity glass of claim 1, wherein the low emissivity glass has a sheet resistance of 5 to 15 $\Omega/cm2$.

4. The low emissivity glass of claim 1, wherein the low emissivity layer comprises at least one selected from the group consisting of silver, copper, gold, aluminum, and platinum.

5. The low emissivity glass of claim 1, wherein the low emissivity layer has a thickness of 5 to 35 nm.

6. The low emissivity glass of claim 1, wherein the oxide dielectric layer is formed directly on the low emissivity layer.

7. The low emissivity glass of claim 1, wherein the oxide dielectric layer comprises at least one selected from the group consisting of zinc oxide, aluminum oxide, zirconium oxide, silicon dioxide, tin oxide, titanium oxide, bismuth oxide, indium-doped tin oxide, gallium-doped zinc oxide, and aluminum-doped zinc oxide.

8. The low emissivity glass of claim 1, further comprising:
a dielectric layer formed on a lower surface of the low emissivity layer.

9. The low emissivity glass of claim 1, further comprising:
an overcoating layer formed on the oxide dielectric layer.

10. The low emissivity glass of claim 1, further comprising:
an undercoating layer formed between the substrate and the low emissivity layer.

* * * * *